United States Patent [19]

Breitenfellner et al.

[11] 4,066,607
[45] Jan. 3, 1978

[54] REINFORCED MOULDING COMPOSITION BASED ON THERMOPLASTIC POLYESTERS

[75] Inventors: Franz Breitenfellner, Bensheim; Lothar Buxbaum, Lindenfels, Odenwald; Karl Leidig, Heppenheim, all of Germany

[73] Assignee: Ciba-Geigy Corporation, Ardsley, N.Y.

[21] Appl. No.: 703,712

[22] Filed: July 9, 1976

[30] Foreign Application Priority Data

July 22, 1975 Switzerland .......................... 9566/75

[51] Int. Cl.$^2$ ................................................ C08K 3/40
[52] U.S. Cl. ................................................ 260/40 R
[58] Field of Search ...................................... 260/40 R

[56] References Cited

U.S. PATENT DOCUMENTS

| | | | |
|---|---|---|---|
| 3,671,487 | 6/1972 | Abalins | 260/40 R |
| 3,673,139 | 6/1972 | Hrach | 260/40 R X |
| 3,742,087 | 6/1973 | Nield | 260/40 R X |
| 3,859,246 | 1/1975 | Jackson et al. | 260/40 R |

*Primary Examiner*—Sandra M. Person
*Attorney, Agent, or Firm*—Luther A. R. Hall

[57] ABSTRACT

Moulding materials reinforced with fiber fillers and based on copolyesters of poly-1,4-butylene terephthalate are suitable for the manufacture of mouldings, especially those having thin walls, which have low tendency to distortion.

7 Claims, 1 Drawing Figure

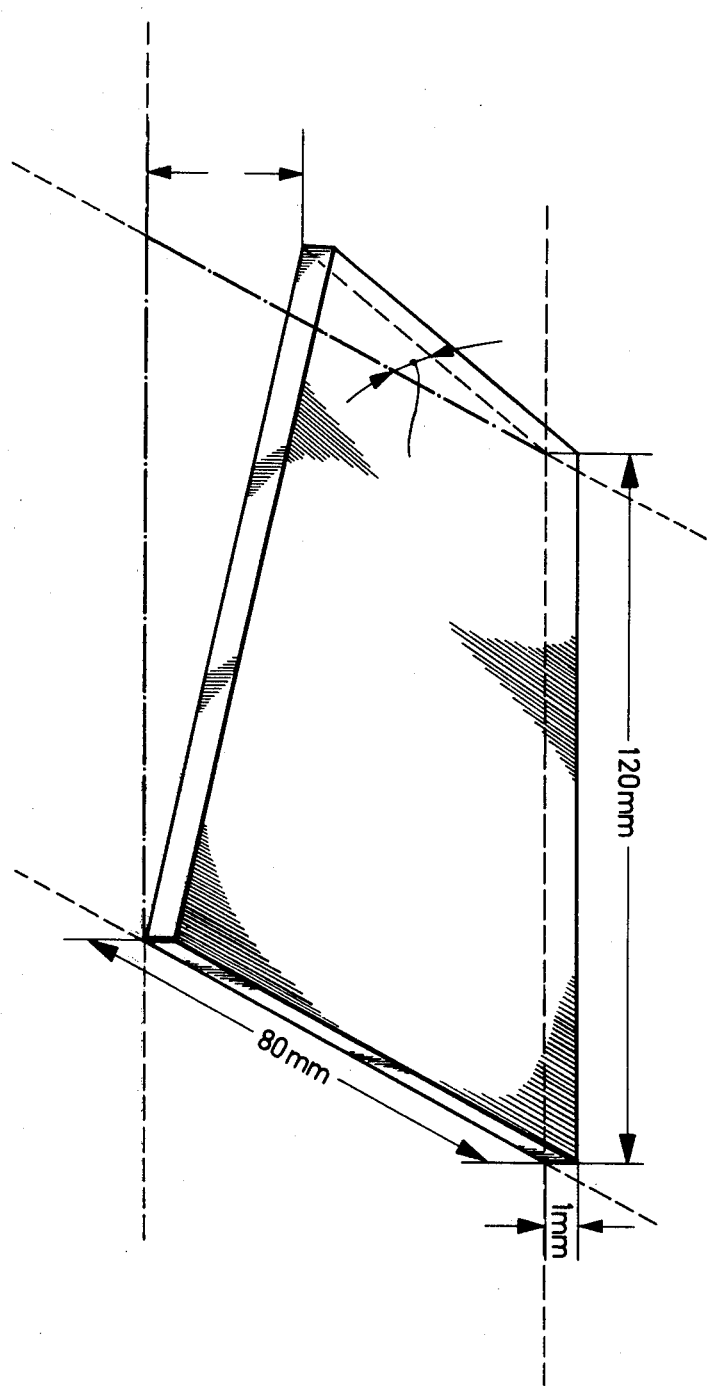

REINFORCED MOULDING COMPOSITION BASED ON THERMOPLASTIC POLYESTERS

The present invention relates to reinforced moulding compositions which are based on copolyesters of poly-1,4-butylene terephthalate and which contain a reinforcing filler.

Because of its processing characteristics and mechanical properties, the reinforced poly-1,4-butylene terephthalate which has been known for a relatively long time from German Auslegeschrift No. 2,042,447, has proved to be a good material for the manufacture of plastic mouldings, for example by known injection moulding and extrusion processes.

However, the injection mouldings reinforced with glass fibres tend to undergo severe distortion and this is the case in particular with mouldings which have thin walls and for the manufacture of which relatively long flow paths are necessary. These mouldings, which have a large surface area, cannot be used for industrial application.

The object of the present invention is to provide a moulding composition which is reinforced with fibre fillers and is based on poly-1,4-butylene terephthalate and which is suitable for the manufacture of mouldings, especially mouldings with thin walls, which have a low tendency to distortion, without this resulting in a substantial reduction in the good mechanical properties and processing characteristics.

The present invention relates to reinforced moulding compositions which are based on thermoplastic polyesters and contain a) a copolyester which is based on poly-1,4-butylene terephthalate and has a crystallisation temperature ($T_C$) of 35° to 70° C and an amount, which produces this $T_C$ range, of one or more cocomponents which are selected from the group comprising orthophthalic acid, isophthalic acid, 4,4'-diphenylsulphonedicarboxylic acid, 2,2-bis-[4-(hydroxyethoxyphenyl)]-propane, 1,3-bis-hydroxyethyl-5,5-dialkyl-hydantoin, 1,3,3-trimethyl-5-carboxy-3-(p-carboxyphenyl)-indane and 1,4-cyclohexanedimethanol and b) 2-60% by weight, based on the total composition, of a reinforcing fibrous filler.

Preferably, the crystallisation temperature ($T_C$), which is a criterion for the tendency of the copolyester to crystallise, is in the range of 40°-60° C. It has been found that a $T_C$ range of 35° to 70° C is obtained when the amount of the cocomponents, relative to the copolyester, is about 1 to 9, and especially 2.5 to 7, mol % of 1,3-bis-hydroxyethyl-5,5-dialkyl-hydantoin, 1 to 6, and especially 1.5 to 5, mol % of 2,2-bis-[4-(hydroxyethoxyphenyl)]-propane, 1 to 6, and especially 1.5 to 5, mol % of 1,3,3-trimethyl-5-carboxy-3-(p-carboxyphenyl)-indane, 3.5 to 20, and especially 5 to 12.5, mol % of isophthalic acid or orthophthalic acid, 1 to 7.5, and especially 1.5 to 6, mol % of 4,4'-diphenylsulphonedicarboxylic acid or 2 to 10, and especially 3 to 8, mol % of 1,4-cyclohexanedimethanol.

Reinforcing fibrous fillers are to be understood as, for example, asbestos, metal fibres, synthetic fibres, carbon fibres and, in particular, glass fibres and are preferably contained in the moulding composition in an amount of 5 to 50% by weight. The fibres can be sized with adhesion promoters in order to give better adhesion to the copolyester. The length of the fibres before mixing in is about 1 to 12, preferably 2 to 8, mm. However, it is also possible to incorporate continuous fibres by means of an extruder in such a way that the length of fibre corresponds to the length of a granule (Fibrefill process).

Moulding compositions in which, based on the copolyester, 3 to 4 mol % of 2,2-bis-[4-(hydroxyethoxyphenyl)]-propane or 4 to 6 mol % of 1,3-bis-hydroxyethyl-5,5-dimethylhydantoin are cocondensed, as the cocomponent, in the copolyester and which contain 5-50% by weight, relative to the total composition, of glass fibres, have proved particularly valuable.

The moulding compositions according to the invention are obtained by known processes by mixing the fibre filler into the copolyester. Mixing in can be effected before, during or after the manufacture of the copolyester. Advantageously, the fibre filler is worked in in an extruder and the mixture is granulated.

The manufacture of the copolyesters to be used according to the invention is carried out, using corresponding amounts, by the processes known for the manufacture of polyesters, such as, for example, melt phase condensation and/or solid phase condensation or according to the acid halide method. The polycondensation reaction is continued until the copolyester, in which the monomer units are distributed statistically through the molecule, has the desired relative viscosity of about 1.3 to 4.0, preferably 1.5 to 3.5. Manufacturing processes are described, for example, in DT-OS No. 2,453,448.

The chosen cocomponents are known compounds which have already been generally proposed for the manufacture of polyesters and some of which are obtainable commercially. 1,3-Bis-hydroxyethyl-5,5-dialkyl-hydantoin is, for example, described in Helv.Chim..Acta 54 (1971) 1695 et seq. The alkyl group preferably contains 1 to 6 C atoms and in particular represents methyl. The two alkyl groups can be identical or different.

Further inert additives of all types, such as further fillers, for example mica or glass spheres, organic or inorganic pigments, optical brighteners, delustring agents, agents which promote crystallisation and agents which render the composition non-combustible or are flame-retardant, for example organic compounds or polymers which contain chlorine and/or bromine and which can, in particular, be used together with antimony trioxide, can be added when the polyester melt is worked up, before the polycondensation reaction or when incorporating the fibrous filler.

The moulding compositions according to the invention are outstandingly suitable for the manufacture of crystalline, reinforced injection moulded articles and, especially in the case of articles having thin walls or a large surface area, only a very slight distortion is to be found. Apparently, the crystallisation characteristics set up in the chosen copolyester have a surprisingly advantageous effect in reinforced formulations and unexpectedly counteract the distortion which is observed when poly-1,4-butylene terephthalate reinforced with glass fibres is used. The processing characteristics are advantageous, as are the mechanical properties. The distinct increase in the notched impact strength is particularly advantageous.

The examples which follow illustrate the invention in more detail. The crystallisation temperature of the copolyester is determined by means of differential thermo-analysis on a sample which has been heated for 3 minutes at 300° C and then rapidly chilled. The chilled sample is heated at a heating rate of 16° C/minute by means of a DSC-1B differential scanning calorimeter from Messrs. Perkin-Elmer. The top of the exothermic peak in the thermogram of the sample is designated the crystallisation temperature. A schematic thermogram which is obtained by this method is shown, for example, in DT-OS No. 2,453,448. The relative viscosity of the copolyesters is determined at 30° C for solutions of 1 g of copolyester in 100 ml of a mixture consisting of equal parts of phenol and 1,1,2,2-tetrachloroethane.

The distortion is determined by means of the angle of distortion, using the following method: the moulded article is laid on a plane support and the angle at the corner opposite to the edge from which moulding takes place, which is formed between the plane and the edge opposite to the edge from which moulding takes place, is measured. Reference should be made to the attached drawing for a more detailed explanation.

EXAMPLE 1

3,380 g of dimethyl terephthalate (DMT), 2,720 g of butanediol, 632 g (10 mol %, based on DMT) of 2,2-bis-[4-(hydroxyethoxyphenyl)]-propane (Dianol 22) and 2.3 g of tetraisopropyl titanate are filled into a 10 liter reactor provided with a stirrer, a nitrogen inlet, a separating column and a device for measuring the temperature and the mixture is heated to 140° C. 98% of the amount of methanol theoretically to be expected are distilled off in the course of 2.5 hours, whilst stirring and passing in nitrogen, and during this time the temperature of the reaction mixture rises to 210° C.

The trans-esterification product thus obtained is transferred into a second reactor and, after the reaction mixture has been heated to 230° C, a vacuum of 140 mm Hg is applied in the course of half an hour using a water pump. The vacuum is increased to 0.50 mm Hg in the course of 45 minutes, using a vacuum pump, whilst raising the reaction temperature to 250° C. The reaction temperature and the vacuum are then maintained under these reaction conditions for 5½ hours. The reactor is then emptied and the resulting polyester, which has a relative viscosity of 2.45, is granulated. The crystallisation temperature $T_C$ of the copolyester containing 5 mol % of Dianol 22 is 60° C.

3 kg of the resulting granules are mixed with 1.3 kg of 6 mm long glass fibres, the mixture is regranulated using an extruder and the moulding composition thus obtained is injection-moulded to give sheets having dimensions of 120 × 80 × 1 mm, the injection of the sheets being carried out from a film gate at the 80 mm wide side. The cylinder temperatures, rising from the hopper to the nozzle, are 230° C, 250° C and 270° C, whilst the mould temperature is 80° C. The angle of distortion is only 1.7°.

EXAMPLE 2

3,380 g of dimethyl terephthalate (DMT), 2,720 g of butane-1,4-diol, 432 g (10 mol %, based on DMT) of 1,3-bis-hydroxyethyl-5,5-dimethylhydantoin (BH-DMH) and 2.3 g of tetraisopropyl titanate are filled into a 10 liter reactor provided with a stirrer, a nitrogen inlet, a separating column and a device for measuring the temperature and the mixture is heated to 140° C. 97% of the amount of methanol theoretically to be expected are distilled off in the course of 2.5 hours, whilst stirring and passing in nitrogen, and during this time the temperature of the reaction mixture rises to 205° C.

The trans-esterification product thus obtained is transferred into a second reactor and after the reaction mixture has been heated to 230° C, a vacuum of 90 mm Hg is applied in the course of half an hour using a water pump. The vacuum is increased to 0.50 mm Hg in the course of 40 minutes, using a vacuum pump, whilst raising the reaction temperature to 250° C. The reaction temperature and the vacuum are then maintained under these reaction conditions for 5 hours. The reactor is then emptied and the resulting polyester, which has a relative viscosity of 2.48, is granulated. The crystallisation temperature $T_C$ of the copolyester containing 5 mol % of BH-DMH is 52° C.

3 kg of the granules thus obtained are mixed with 1.3 kg of 6 mm long glass fibres, the mixture is regranulated using an extruder, the moulding composition thus obtained is injection-moulded, as described, to give sheets, and an angle of distortion of only 2.2 degrees is measured on the sheets.

EXAMPLE 3 (Comparison Example)

3 kg of poly-1,4-butylene terephthalate (PBT), which has a relative viscosity of 2.42 and a crystallisation temperature of 30° C, are mixed with 1.3 kg of 6 mm long glass fibres, the mixture is regranulated using an extruder and the moulding composition thus obtained is injection-moulded, as described in Example 1, to give sheets. An angle of distortion of 11.1 degrees is measured on the highly distorted sheets.

EXAMPLES 4–10

Analogously to Examples 1 and 2, the following copolyesters are manufactured and reinforced with 30% by weight of glass fibres and the angle of distortion is measured on sheets manufactured from these moulding compositions. The results are summarised in Table 1:

Table 1

| Example No. | Copolyester (PBT = poly-1,4-butylene terephthalate/mol %, based on copolyester) | $\eta$relative | Crystallisation temperature $T_C$ (° C) | Angle of distortion ($\alpha$) (degrees) |
| --- | --- | --- | --- | --- |
| 4 | PBT, 2.5 mol % of Dianol 22 | 2.24 | 45 | 3.0 |
| 5 | PBT, 2.5 mol % of BH-DMH | 2.15 | 41 | 3.7 |
| 6 | PBT, 10 mol % of isophthalic acid | 2.08 | 45 | 3.0 |
| 7 | PBT, 5 mol % of phenylindane-dicarboxylic acid | 1.95 | 59 | 1.8 |
| 8 | PBT, 5 mol % of 4,4'-diphenyl-sulphonedicarboxylic acid | 1.97 | .56 | 1.9 |
| 9 | PBT, 10 mol % of dimethanolacid | 2.11 | 44 | 3.1 |
| 10 | PBT, 7.5 mol % of 1,4-cyclohexane-dimethanol | 1.98 | 46 | 2.8 |

EXAMPLE 11

The moulding compositions according to Examples 1, 2, 3 and 6 are processed, by injection moulding, to give test bars for determining the tensile strength, the flexural strength, the modulus of elasticity, the impact strength, the notched impact strength and the heat distortion point. The mechanical and physical properties shown in Table 2 are determined for the test bars.

The mechanical and physical properties of the moulding compositions of Examples 1, 2 and 6, which are according to the invention and little subject to distortion, are very similar to those of the moulding composition which corresponds to Comparison Example No. 3 and has a high tendency to distortion.

hydroxyethyl-5,5-dialkylhydantoin, 1 to 6 mol % of 2,2-bis-[4-(hydroxyethoxyphenyl)]-propane, 1 to 6 mol % of 1,3,3-trimethyl-5-carboxy-3-(p-carboxyphenyl)-indane, 3.5 to 20 mol % of isophthalic acid or orthophthalic acid or 1 to 7.5 mol % of 4,4'-diphenylsulphonedicarboxylic acid or 2 to 10 mol % of 1,4-cyclohexanedimethanol.

4. A moulding composition according to claim 1, characterised in that it contains glass fibres as the filler.

5. A moulding composition according to claim 1, characterised in that, based on the copolyester, 3 to 4

| Composition | Tensile strength DIN 53,455 (kp/cm$^2$) | Flexural strength ASTM D 790 (kp/cm$^2$) | Modulus of elasticity DIN 53,457 (kp/cm$^2$) | Impact strength DIN 53,453 (cmkp/cm$^2$) | Notched impact strength DIN 53,453 (cmkp/cm$^2$) | Heat distortion point ISO/R 75 Procedure A (° C) |
|---|---|---|---|---|---|---|
| 70% by weight of PBT homopolymer 30% by weight of glass fibres | 1,330 | 2,020 | 85,000 | 40 | 10 | 205 |
| 70% by weight of PBT containing 5 mol % of BH-DMH 30% by weight of glass fibres | 1,370 | 2,100 | 82,400 | 40 | 12 | 186 |
| 70% by weight of PBT containing 5 mol % of Dianol 22 30% by weight of glass fibres | 1,370 | 2,000 | 78,100 | 42 | 14 | 175 |
| 70% by weight of PBT containing 10 mol % of isophthalic acid 30% by weight of glass fibres | 1,220 | 1,910 | 84,800 | 41 | 14 | 163 |

What is claimed is:

1. A reinforced moulding composition which is based on a thermoplastic polyester and contains (a) a copolyester which is based on poly-1,4-butylene terephthalate and has a crystallisation temperature ($T_C$) of 35° to 70° C and an amount, which produces this $T_C$ range, of one or more cocomponents which are selected from the group comprising orthophthalic acid, isophthalic acid, 4,4'-diphenylsulphonedicarboxylic acid, 2,2-bis-[4-(hydroxyethoxyphenyl)]-propane, 1,3-bis-hydroxyethyl-5,5-dialkyl-hydantoin, 1,3,3-trimethyl-5-carboxy-3-(p-carboxyphenyl)-indane and 1,4-cyclohexanedimethanol and (b) 2–60% by weight, relative to the total composition, of a reinforcing fibrous filler.

2. A moulding composition according to claim 1, characterised in that the crystallisation temperature is 40°–60° C.

3. A moulding composition according to claim 1, characterised in that the amount of the cocomponent, relative to the copolyester, is 1 to 9 mol % of 1,3-bis-hydroxyethyl-5,5-dialkylhydantoin, 1 to 6 mol % of 2,2-bis-[4-(hydroxyethoxyphenyl)]-propane or 4 to 6 mol % of 1,3-bis-hydroxyethyl-5,5-dimethylhydantoin are cocondensed, as the cocomponent, in the copolyester and that it contains 5–50% by weight, based on the total composition, of glass fibres.

6. Use of the moulding composition according to claim 1 for the manufacture of injection-moulded articles.

7. A moulding composition according to claim 3, characterised in that the amount of the cocomponent, relative to the copolyester, is 2.5 to 7 mol% of 1,3-bis-hydroxyethyl-5,5-dialkylhydantoin, 1.5 to 5 mol% of 2,2-bis[4-hydroxyethoxyphenyl]propane, 1.5 to 5 mol% of 1,3,3-trimethyl-5-carboxy-3-(p-carboxyphenyl)-indane, 5 to 12.5 mol% of isophthalic acid, 5 to 12.5 mol% of orthophthalic acid, 1.5 to 6 mol% of 4,4'-diphenylsulphonedicarboxylic acid or 3 to 8 mol% of 1,4-cyclohexanedimethanol.

* * * * *